Figure 1:
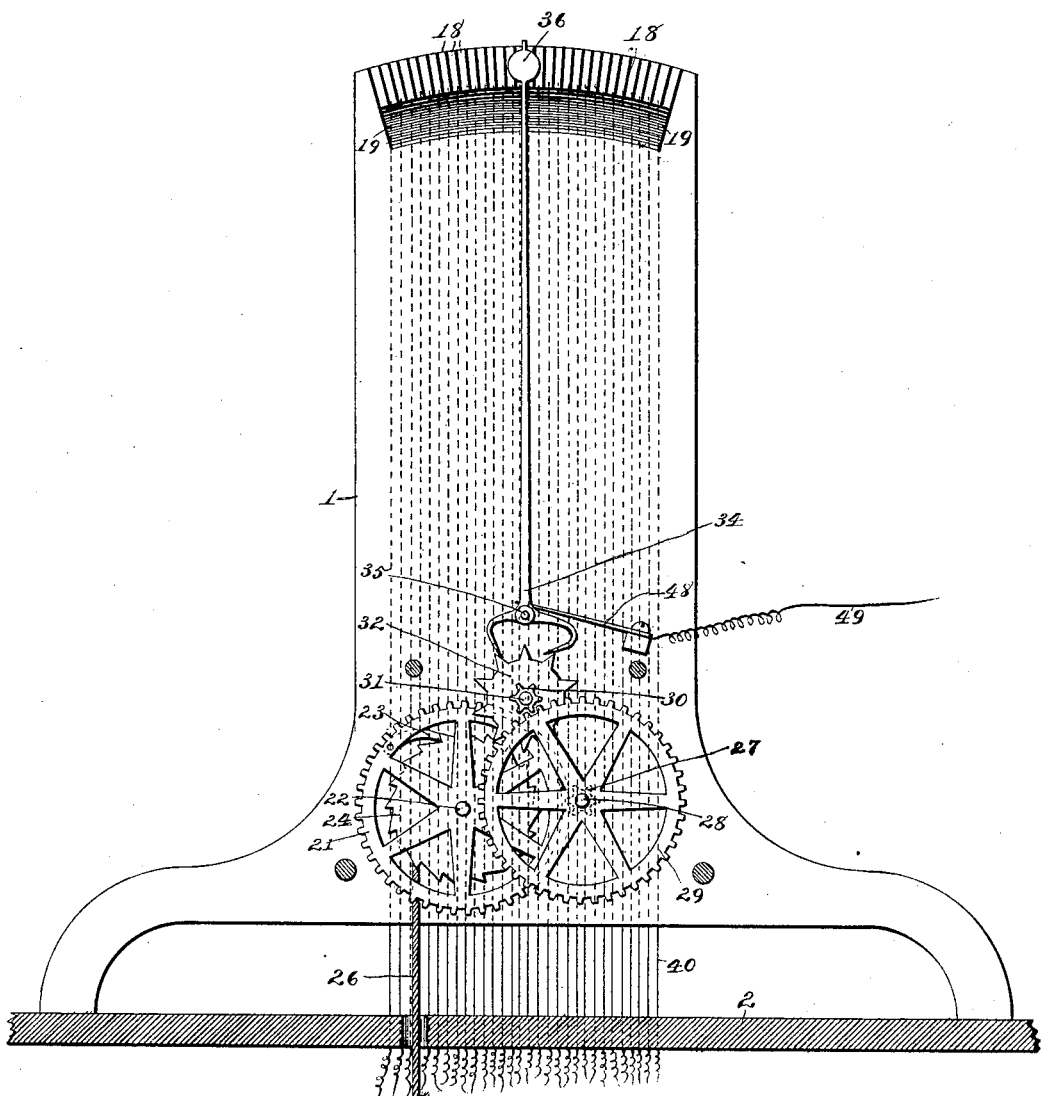

(No Model.)   J. F. McLAUGHLIN.   3 Sheets—Sheet 1.
ELECTRICAL TYPE WRITER.
No. 386,646.   Patented July 24, 1888.

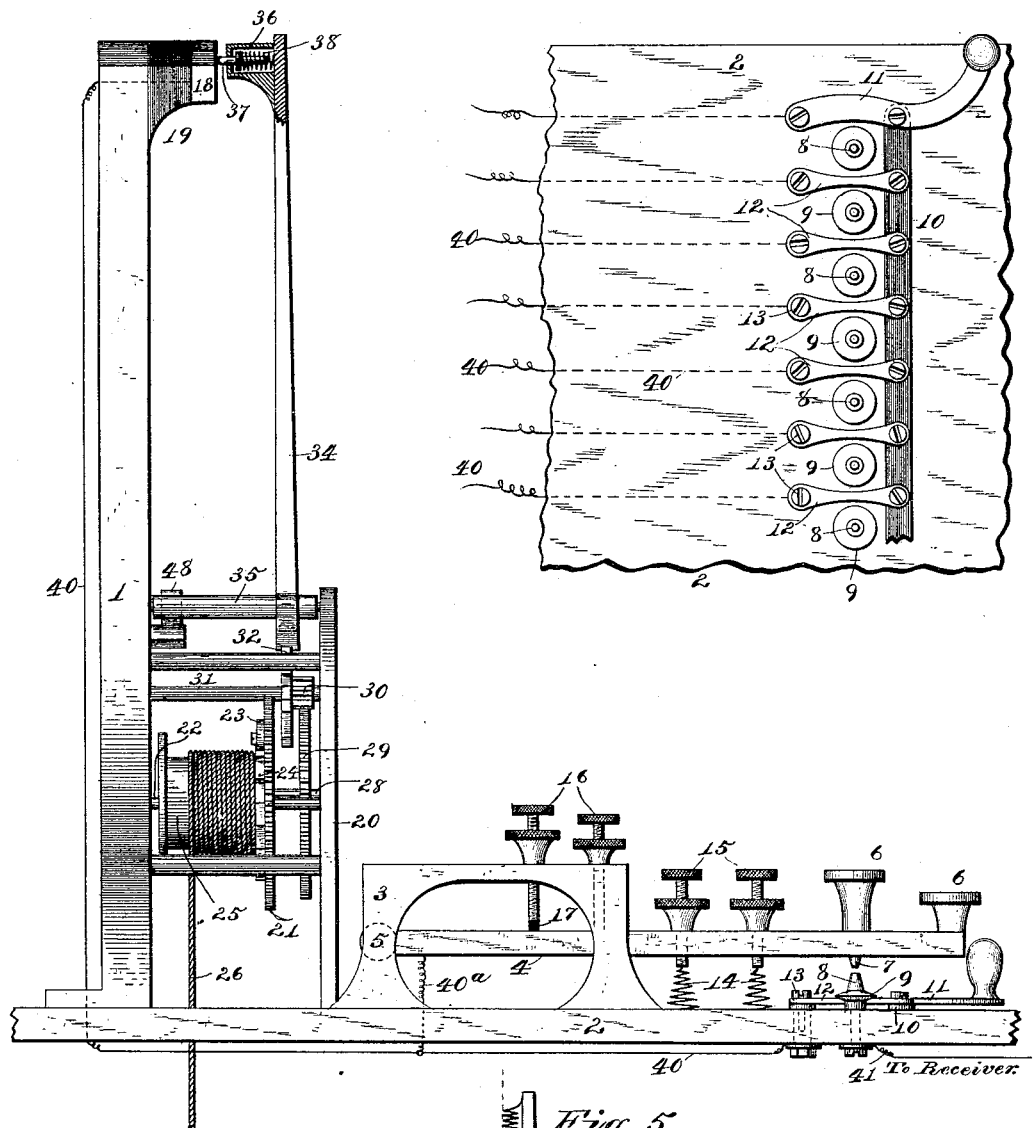

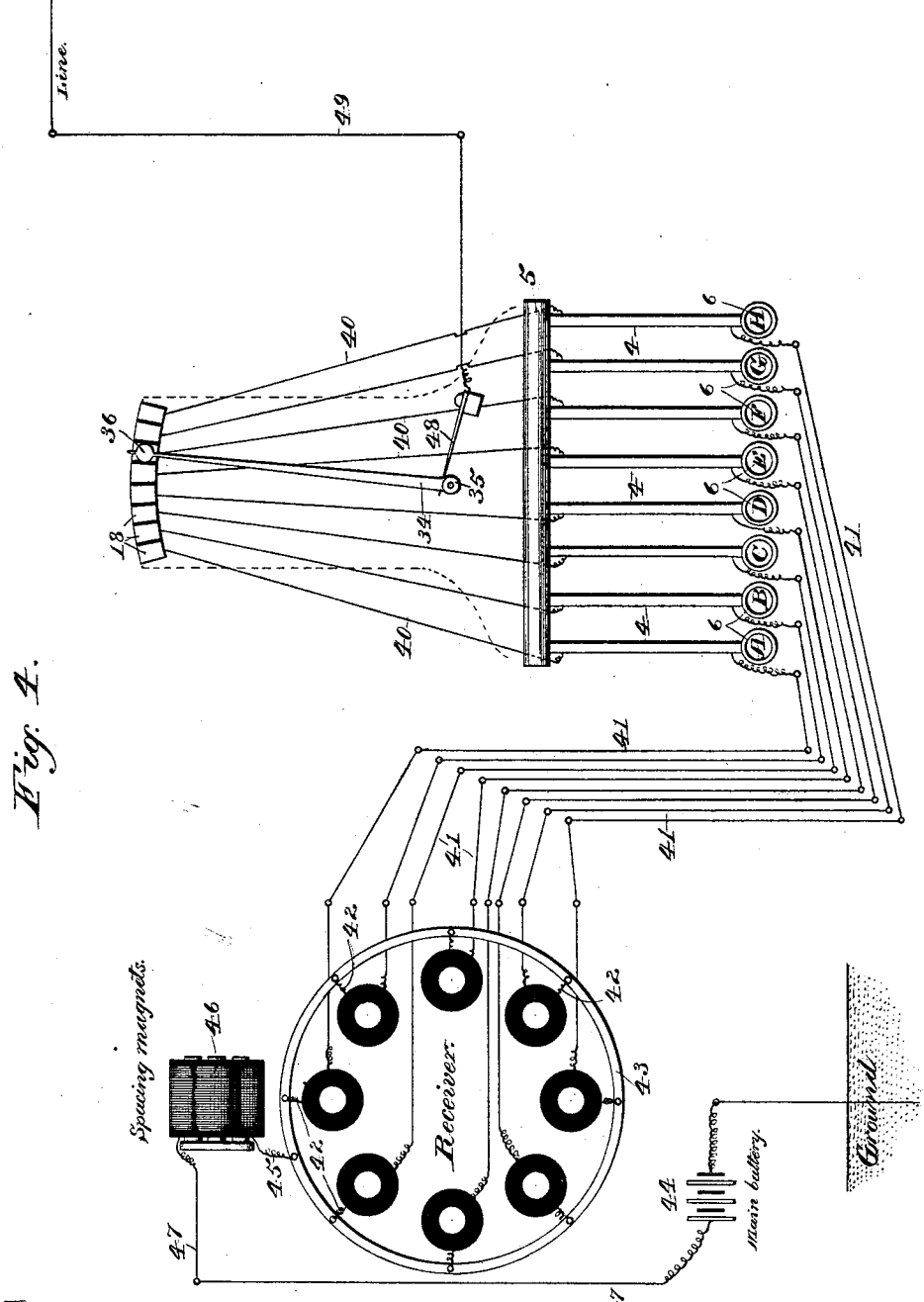

UNITED STATES PATENT OFFICE.

JAMES F. McLAUGHLIN, OF PHILADELPHIA, PENNSYLVANIA.

ELECTRICAL TYPE-WRITER.

SPECIFICATION forming part of Letters Patent No. 386,646, dated July 24, 1888.

Application filed November 17, 1887. Serial No. 255,432. (No model.)

*To all whom it may concern:*

Be it known that I, JAMES F. MCLAUGHLIN, a citizen of the United States, residing at Philadelphia, in the county of Philadelphia and State of Pennsylvania, have invented certain new and useful Improvements in Electrical Type-Writers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a transmitting-instrument for transmitting electrical impulses over a line-circuit, and such invention, although designed particularly for use in conjunction with my improved electrical type-writer, forming the subject-matter of several patents and pending applications, can be independently utilized to synchronously convey or transmit the electrical impulses imparted by the manipulation of the keys of an instrument at one extremity of main-line circuit to a similar instrument located at the other extremity of said line. When this organization of apparatus is used in connection with a printing-telegraph, or in other words, with any suitable receiver which records the message in legible form, each instrument or transmitter at the respective stations in the line-circuit is suitably electrically connected with such local receiver, so that by the manipulation of the keys of the transmitter at one end of a line the circuit is controlled from a suitable constant and reliable source of electricity, and the electrical impulse, imparted synchronously and simultaneously, actuates the registering mechanism of such local receiver, then traversing its line-circuit through the distant transmitter (which is partly inactive) to its local receiver and then to ground.

The object of my invention is to provide an improvement upon the transmitting-instrument shown, described, and claimed in Letters Patent No. 363,158, granted to me on May 17, 1887, whereby manifest improvement in mode of construction and operation is attained, and to furnish an improved instrument of this class which will be simple in its construction, efficient in operation, durable in use, and capable of being utilized either independently as a reading-telegraph, or, by certain electrical connections with local receivers, can be adapted to synchronously operate either or both of such latter instruments at as many different stations in a line-circuit as may be desired.

With these objects in view my invention consists in a certain organization of apparatus, arrangement, and combination of parts, and electrical connections, all of which will be particularly and definitely described hereinafter, and the specific points of novelty in which will be designated in the appended claims.

Referring to the accompanying drawings, Figure 1 is a front elevation of my improved instrument, the exterior casing being detached for an inspection of the interior parts. Fig. 2 is a side elevation of the same together with the key-board thereof. Fig. 3 is a detail top plan view of the contact-points of the key-board and the circuit-closer for throwing all the said contacts electrically in circuit with their respective segments. Fig. 4 is a diagrammatical view showing the transmitting-instrument in circuit with a local receiver which corresponds to the construction of my electrical type-writer, Patent No. 367,650, dated August 2, 1887. Fig. 5 is a modification of the electrical spring contact shown in Fig. 2.

Like numbers of reference mark similar parts or like parts in the several views of the drawings.

Referring to the drawings by numbers, 1 indicates an upright supporting-frame carrying the superincumbent parts, and is secured to the horizontal base 2 of the instrument in any suitable manner.

Upon the base 2 is mounted the key-board of the instrument, which is constructed as follows:

3 designates a rectangular elevated frame-work, which extends transversely across the key-board and serves as a support for the pivot-bar 5 of the series of circuit-closing levers 4 4, which are respectively insulated from and pivoted upon the said pivot-bar 5, which, in turn, is trunnioned at each extremity by a small arbor or stud in the said frame 3, and at the other end of the key-levers 4 4 are placed the finger-keys 6 6, which carry the letters, characters, or symbols of the key-board, and on the under side of each key-lever and near the forward extremity thereof is provided a depending contact-point, 7, which is designed to engage its respective contact 8. The said contacts 8 8 are arranged in the same horizontal line upon the base 2 of the key-board, and are provided near their center, as shown in Fig. 2, with the projecting beveled bosses or flanges 9 9, for a purpose to be hereinafter explained.

10 designates a link-rod of insulating material parallel with the line of contacts 8 8, and pivotally connected at its forward extremity to the hand-lever 11, and further provided with a series of link contact-plates, 12 12, which, in their turn, are each pivoted at one end to the screws 13 13, and at their other ends to the link-rod 10, and correspond in number to their respective contacts 8 8. These contact link-plates 12 12 project each between any two of the series of contact-points 8 8, and when shifted in either direction by the hand-lever 11 are adapted to engage and slip under the flanges or bosses of their respective contact-points 8 8. Thus it will be seen that by shifting the said switch-lever 11 in one direction each contact-point 8 8 is electrically connected with the wire 40 by its respective link 12, while, on the other hand, if the position of the parts remain as shown in Fig. 3 the circuit will be open at each contact-point 8.

The several circuit-closing key-levers 4 4 are formed of current-conducting metal, and are alternately of different lengths, as shown in Fig. 2—that is to say, the series of longer levers terminating in the finger-keys of the outer row of the key-board, while the shorter levers carry the finger-keys of the inner row. However, as will be observed by an inspection of Fig. 2, the contact-points 7 7, which are arranged on each key-lever, are in the same horizontal and vertical plane with the contacts 8 8, so as to precisely and accurately engage their corresponding contacts 8 8, when any lever 4 is depressed by its finger-key 6.

Although I have shown and described the key-board arranged in alternate banks or rows, I do not confine myself to such construction, as it will be readily understood that the same may be constructed in any suitable manner for convenience in manipulation.

14 14 indicate a series of retracting-springs, one for each key-lever, and each having its lower extremity secured to the base 2 and its upper end attached to its adjusting-screw 15, which latter enters through a suitable aperture or perforation in its respective key-lever 4, and 16 16 are a series of limiting-screws mounted through apertures in the frame 3 and are so arranged as to restrict or limit the upward play or reciprocation of their respective key-levers 4 4, and are tipped at their inner ends with pieces of insulation 17, for the obvious purpose of preventing electrical contact with any key-lever 4.

Upon the upper portion of the vertical frame-work 1 is placed a series of current-conducting segments, 18 18, arranged, as shown in Fig. 1, in the arc of a circle and each insulated from the next adjacent segment, and all supported in an elevated position by the hard rubber or other insulation 19. (See Figs. 1 and 2.)

20 represents a vertical plate arranged parallel to the frame 1 and serving to support the different co-operating parts of the clock-work motor, which comprises in brief a train of wheels actuated normally by a weight and cord or other suitable motive power and is arranged and constructed as follows: The train of wheels of this step-by-step motor are set into motion by the large pinion or gear wheel 21, which is mounted loosely on the winding-shaft 22, and is provided with a pawl-dog, 23, adapted to engage the teeth of the ratchet-wheel 24, which in turn is either keyed rigidly upon the shaft 22 or formed integral with the drum 25, which latter is also mounted rigidly upon the said shaft 22. The ratchet-wheel 24 is revolved normally by the cord 26, provided with a depending weight, 33. (Shown in Fig. 1.) However, it will be apparent that the equivalent of such construction would be a spring arranged to normally rotate said drum. The wheel 24 meshes with the small pinion 27, (shown in dotted lines in Fig. 1,) which pinion is mounted rigidly in the shaft 28, which carries the gear-wheel 29.

30 is another pinion mounted rigidly on the shaft 31 and meshing with the wheel 29, whereby rotary motion is imparted to said shaft 31, which in turn carries the actuating scape-wheel 32. 34 indicates an ordinary pivoted escapement-lever placed in proper relation to its scape-wheel 32 and arranged to be oscillated back and forth by the movement thereof. This lever is made of current-conducting metal, and is pivoted upon the shaft 35, which in turn is trunnioned in the center of the surface of the upright frame 1, as shown clearly in Fig. 1, so that the play of said lever to either the right or left encompasses the same area of the segments 18 18; or, in other words, since the normal position of the lever, as shown in Fig. 1, is parallel with the central line of the frame 1 it has equal play upon the segments 18 18, no matter to which side it may be vibrated by the scape-wheel 32.

Upon the forward free end of the lever 34 is formed a laterally-projecting boxing, 36, containing the spring-actuating contact-plate 37, which by means of the coiled spring 38 is kept normally in contact with a segment, 18, by the agency of the tension exerted by said spring, so that during the vibration of the lever to and fro a perfect electrical contact is secured, as will be clearly apparent. However, instead of this construction it is advisable to use in practice the arrangement shown in Fig. 4, which consists merely in substituting for the contact-plate 37 a coiled spring, 39, secured in a compressed position with the surface of the spirals in contact with the segments, the extremities of said springs being sufficiently rigid to offer resistance to the longitudinal expansion of the coils.

The series of segments 18 18 correspond in number and relative situation to their respective link-plates 12 12, key-levers 4 4, and finger-keys 6 6 of the key-board, and each segment 18 is connected electrically with its corresponding contact-link 12 by the wire 40 and branch wire 40ᵃ, while each contact-point 8 of the series of key-levers is electrically connected with one terminal of its primary magnet in the receiving-instrument by wire 41, the other terminal of said magnet being in circuit with the ring 43 by wire 42. The ring 43 is in circuit with one pole of the battery 44 through wires 45 and 47 and the spacing-magnets 46.

Each link-contact 12 is, as before stated, in circuit through its pivot-screw, with its corresponding segment 18, by wire 40; and thus it will be seen that when all the link-plates are in contact with their respective contact-points 8 8 the latter are severally in circuit with their respective segments. The escapement-lever 34 is in circuit with the line 49 by the brush 48, which bears normally upon the pivotal support 35 of said lever.

Before proceeding further into a description of the operation of my invention I will first preface a short explanation of the character and operation of the class of receiving-instrument shown in circuit with my invention, and shown, described, and claimed in Letters Patent No. 367,650, granted to me on the 2d day of August, 1887, so that a clear and comprehensive understanding may be had of the improvements hereinafter claimed. Accordingly I will say that each key-lever 4 is so arranged that a depression thereof will cause an electrical impulse to be discharged from the source of electricity simultaneously through an electro-magnet which corresponds to the key-lever depressed, said impulse causing the energization of said magnet, and thereby effecting the attraction of its armature, which action forces the impact of a type-lever depressed against an ordinary traveling paper roll. Then the same impulse passes into the spacing-magnets of such receiving-instrument, which are of a higher resistance than the printing-magnets, thereby energizing said spacing-magnets and operating the step-by-step motor at a determinate instant after the registration of the particular letter has been made upon the paper roll; and, finally, the same electric impulse in its passage over its path through the transmitting-instruments at both extremities of a line-circuit and over the line is utilized to similarly effect a registration of a like character in a receiving-instrument of similar construction at a distant station.

The construction of the kind of receiving-instrument just described may be found in my separate pending application, Serial No. 244,434, filed July 16, 1887, as well as my Letters Patent before mentioned, and, consequently, it is not thought necessary to enter more fully into a detailed description, since sufficient has been described to enable any one skilled in the art to which this invention appertains to comprehend the operation of the receiving-instrument in conjunction with which my invention is used, and, moreover, since the novelty of this instrument is not at all dependent upon any auxiliary receiver.

Two of my transmitting-instruments, each being of the construction hereinbefore described, are placed, respectively, at two or more extremities of a line-circuit, as shown conventionally in Fig. 4, which, for the sake of convenience, will be hereinafter referred to as theoretically representing two stations, since the operation at each extremity of the line is identical. The train of wheels for imparting vibrating motion to each escapement-lever 34 34 of the respective transmitting-instruments are relatively exact in construction, pattern, &c., and their actuating-weights are of the same avoirdupois, all of which is for the purpose of maintaining perfect and relative synchronism between any two levers 34 34 which may be included in a line-circuit; or, in other words, the object of this clock-work motor applied to two widely-separated escapement-levers is for the obvious purpose of making all the vibrations of both levers relatively equal in speed, duration of time, and extent of stroke, so that when the forward free end of the lever 34 at one station is upon a segment, 18, its corresponding lever 34 at another station will be upon a correspondingly relatively-situated segment, whether both of the arms are vibrating or are stationary.

The operation of my invention is as follows, presupposing that Fig. 4 represents two stations included in the same line-circuit, and that the clock-work motors of the respective transmitting-instruments are operating in synchronism: The transmitting and receiving instruments being in the position shown in Fig. 4, (which figure now represents a transmitting-station,) and the circuit-closing switch for the contacts 8 8 being in the position shown in Fig. 3, and the operator at the transmitting-station desiring to convey a message—say, for example, the word "dynamograph"—over the line 49 to a distant station, he successively depresses the keys 6 6, which carry the letters comprising this stipulated message. Now, in order to clearly follow the operation, we will suppose that the first key corresponding to the letter D is that carried by the long key-lever in Fig. 2. Consequently, the depression of said key causes an electrical impulse to be discharged from the battery 44 through wire 47, spacing-magnets 46, wire 45, and around the ring 43 into the printing-magnet of the receiving-instrument, through which the circuit is closed by the depression of the said key, energizing the same and causing its pivoted armature to be attracted, which action effects the impact of a type-lever up against the paper carried and fed by the traveling paper-roll. Then, the said spacing-magnets 46 being more sluggish in their action than the printing-magnets, the same impulse will energize said spacing-magnets at a determinate instant after the impact has been made, in the manner before stated, upon the paper roll, and will thereby effect the advancement of the traveling carriage one letter-space, ready for the next letter to be printed. Simultaneously with the energization of the printing-magnets and the imprint of the letter D at the transmitting-station the current will traverse the particular wire 41, connecting the printing-magnet with its respective contact-point 8, (see Fig. 2,) up through the contacts 7 and 8, the lever 6, the branch wire 40ª, and the wire 40, to the particular segment, 18, which corresponds to the key depressed, and the escapement-lever 34, vibrating, as before stated, rapidly over the surface of the series of segments 18, and being in perfect synchronism with the corresponding lever 34 at the receiving-station, the current will pass from this segment 18, through the plate 37, spring 38, lever 34, brush 48, to the line 49, and over said line to the distant or receiving station, which may also be conventionally represented by Fig. 4. Therefore the current having passed over the line 49, as before stated, to the distant station, and the circuit-closing switch shown in Fig. 3 being so adjusted as to connect all the contacts 8 8 electrically in circuit with their respective segments 18 18, the said current will pass over its path 49 48 34 to its particular segment 18, which corresponds both to the key depressed at the other station and to the segment 18 corresponding to said key at such station; and now, it being understood that the lever 34 at the receiving-station is in synchronism with its corresponding lever at the transmitting-station, and that the switch-lever 11 has been shifted so as to electrically connect each contact-point 8 at said receiving-station with its respective segment 18, the current may be traced over its path, as follows: From the segment 18, wire 40, screw 13, link-contact plate 12, contact-point 8, wire 41, into the printing-magnet of the receiving-instrument corresponding to the printing-magnet at the transmitting-station, which has been previously described as being energized, thereby effecting the imprint of the particular type-lever corresponding to the letter D upon the paper-roll, and the operation of the letter-spacing mechanism in the same manner as at the other end of the line, the current having instantaneously passed from the last-mentioned printing-magnet to the ground at said receiving-station. Thus the operation is repeated until the end of the word "dynamograph" is reached. Should it now be desirable to make a space between the word completed and the next to be printed, a spacing-key (not shown) of the transmitting-instrument is depressed, thereby transmitting an electrical impulse over the line and through both transmitting and receiving instruments and effecting a space between the word without making an imprint upon the paper at either station.

The spacing-key of the transmitting-instrument is merely auxiliary in its functions, serving only to energize the spacing-magnets in the respective receivers and to transmit the desired electric impulse. Therefore, as the means for making the desired spaces without effecting an imprint forms a part of the construction of the receiving-instrument forming the subject-matter of the before-mentioned application and Letters Patent, it will not be further dwelt upon herein.

In order to transmit from the distant station back to the transmitting-station, an inverse arrangement of the respective circuit-closing switches is all that is required.

Suitable means may be provided for either separately or jointly stopping or starting the synchronal motors when the instruments are arranged, respectively, at two or more stations. However, this feature is designed for a separate application and will not be described herein.

Having thus fully described my invention, what I claim, and desire to secure by Letters Patent of the United States, is—

1. In a transmitting-instrument, the combination, with a series of segments, each electrically connected with a circuit-controller, of a vibrating commutator electrically in contact with said segments and included in a line-circuit, the circuit, and a circuit-controlling switch for connecting and disconnecting said segments with the circuit.

2. In a transmitting-instrument, the combination, with a series of current-conducting segments, of mechanism for severally directing electric impulses through said segments, an electric circuit including said segments, a circuit-controlling switch for connecting and disconnecting said circuit with said segments, a commutator-arm vibrating electrically in contact with said segments, and a synchronal motor for vibrating said arm.

3. In a transmitting-instrument, the combination, with a series of segments electrically in circuit with a series of corresponding circuit-closers, suitable contacts for said circuit-closers in circuit with a source of electricity, a lever-switch for severally connecting the series of contacts with the series of segments, a vibrating arm electrically in contact with said segments and included in a line-circuit, and a line-circuit, substantially as described.

4. The combination of two instruments, respectively placed at separate stations in a line-circuit and each comprising a series of segments, circuit-closing mechanism for directing the current severally through said segments, a vibrating arm electrically in contact with said segments, a mechanical synchronal motor for vibrating said arm, and a circuit-changing switch for cutting the source of electricity in or out of circuit with a series of segments, substantially as described.

5. The combination, with a series of contacts in circuit with a source of electricity, of a series of segments and a lever-switch for severally electrically connecting and disconnecting said contacts with said segments, substantially as described.

6. The combination of a series of current-conducting segments respectively in circuit with a series of pivoted contacts, a series of pivoted contacts operated in unison by a single movement of a lever, a shifting-lever for said pivoted contacts, and a series of stationary contacts adapted to be electrically connected with their respective pivoted contacts by the single movement of a lever, substantially as described.

7. The combination, with a series of insulated current-conducting segments charged from a suitable source of electricity, of a moving arm provided with a spiral-spring contact electrically in circuit with said series of segments, substantially as described.

In testimony whereof I affix my signature in presence of two witnesses.

JAMES F. McLAUGHLIN.

Witnesses:
THOS. J. HUNT,
GEO. H. TICHENOR.